US006376771B1

(12) United States Patent
Kosuge

(10) Patent No.: US 6,376,771 B1
(45) Date of Patent: Apr. 23, 2002

(54) PROTECTIVE COVER FOR BATTERY TERMINAL

(75) Inventor: Shuji Kosuge, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/613,255

(22) Filed: Jul. 10, 2000

(30) Foreign Application Priority Data

Jul. 22, 1999 (JP) .......................................... 11-208191

(51) Int. Cl.[7] .................................................. H02G 3/14

(52) U.S. Cl. .......................... 174/66; 174/67; 174/135; 174/138 F; 220/241; 220/242; 439/522

(58) Field of Search ......................... 174/67, 66, 138 F, 174/91, 92, 135, 188, 190; 439/135, 142, 149, 521, 522, 901, 904; 220/241, 242; D8/353

(56) References Cited

U.S. PATENT DOCUMENTS 4,698,459 A * 10/1987 Drake .................... 174/138 F
4,750,094 A * 6/1988 Krasik ......................... 362/95
5,021,305 A * 6/1991 Turner ......................... 429/65
5,576,516 A 11/1996 Kameyama et al.
5,620,338 A * 4/1997 Stephens et al. ............ 439/522
5,977,485 A * 11/1999 Yoshimura et al. ...... 174/138 F
6,090,502 A * 7/2000 Ingram et al. ....... 174/138 F X
6,153,329 A * 11/2000 Raschilla et al. ............. 429/65

* cited by examiner

*Primary Examiner*—Anthony Dinkins
*Assistant Examiner*—Dhiru R Patel
(74) *Attorney, Agent, or Firm*—Banner & Witcoff, Ltd.

(57) ABSTRACT

A protective cover that fits with battery terminals of different sizes includes a main body 11 having a side wall 12A capable of being opened or closed via hinges 13, a battery terminal being inserted from the side when the side wall 12A is in an open state. A position fixing member 14 that houses a clamping ring of a clamping member is made from a pair of surrounding walls 26A and 26B which protrude outwards from the side wall 12A and a side wall 12B. Resilient movable members 40A and 40B are formed out of the surrounding walls 26A and 26B, these members 40A and 40B protruding inwards. The clamping ring of the smaller battery terminal is supported by arc shaped receiving faces 41A and 41B of the resilient movable members 40A and 40B, and the clamping ring of the larger battery terminal is supported by the receiving faces 41A and 41B of the resilient movable members 40A and 40B which have been bent outwards, and by receiving faces 27A and 27B of the surrounding walls 26A and 26B.

11 Claims, 12 Drawing Sheets

PROTECTIVE COVER FOR BATTERY TERMINAL

TECHNICAL FIELD

This invention relates to a protective cover for a battery terminal.

BACKGROUND TO THE INVENTION

In general, battery terminals connected to battery posts are covered by protective covers in order to prevent a short circuit with a car body. Such a protective cover is described in JP 7-85858. This protective cover consists of a covering member provided at one end of a main body that is attached to an electric wire connecting member of the battery terminal. The covering member can be opened and closed due to hinges provided at the end of the main body. A clamping member that clamps a battery post is covered by closing the covering member, the clamping member protruding from one end of the main body. The dimensions of this protective cover correspond to the width of the clamping member of the battery terminal.

The diameters of the battery posts may differ depending on the battery. In such a case, two kinds of battery terminals are required for the battery posts. Along with this, protective covers of different sizes must be provided. That is, the production costs rise since two sizes of special purpose protective covers must be manufactured. Moreover, managing parts becomes problematic since the parts must be handled separately due to the differing sizes.

The present invention has been developed after taking the above problems into consideration and aims to present a protective cover that is suitable for terminals having different sizes.

SUMMARY OF THE INVENTION

According to the invention there is provided a protective cover for a clamp type battery terminal of a battery post, the terminal comprising a clamping member and a wire joining member, wherein said cover comprises a body having a position fixing member for housing a clamping member and adapted to grip the circumference of a predetermined size of clamping member, resilient arms protruding to the interior of said position fixing member for contact with a relatively smaller size of clamping member, said arms being adapted to retreat when in contact with a clamping member of said pre-determined size.

Such a cover is adapted to fit both large and small clamping members, the resilient arms ensuring that the clamping member is positively engaged. Accordingly a single plastics moulding will suffice with consequent reduction in production cost, inventory and risk of wrong assembly.

Preferably the cover body includes a hinged side wall which permits insertion of the clamping member from the side. This arrangement facilitates movement of the position fixing members into engagement with the clamping member, and avoids interference inherent in a clamping member inserted from below.

The terminal typically has a clamping member and wire joining member depending from a linking member which defines a channel. Preferably the cover includes a wall extending from one side into said channel. Such a wall both electrically isolates the end of a wire in the wire joining member and prevents fore and aft movement of the cover on the terminal.

BRIEF DESCRIPTION OF THE DRAWINGS

Other features of the invention will be apparent from the following description of a preferred embodiment shown by way of example only in the accompanying drawings, in which.

DESCRIPTION OF PREFERRED EMBODIMENT

Figure 1:
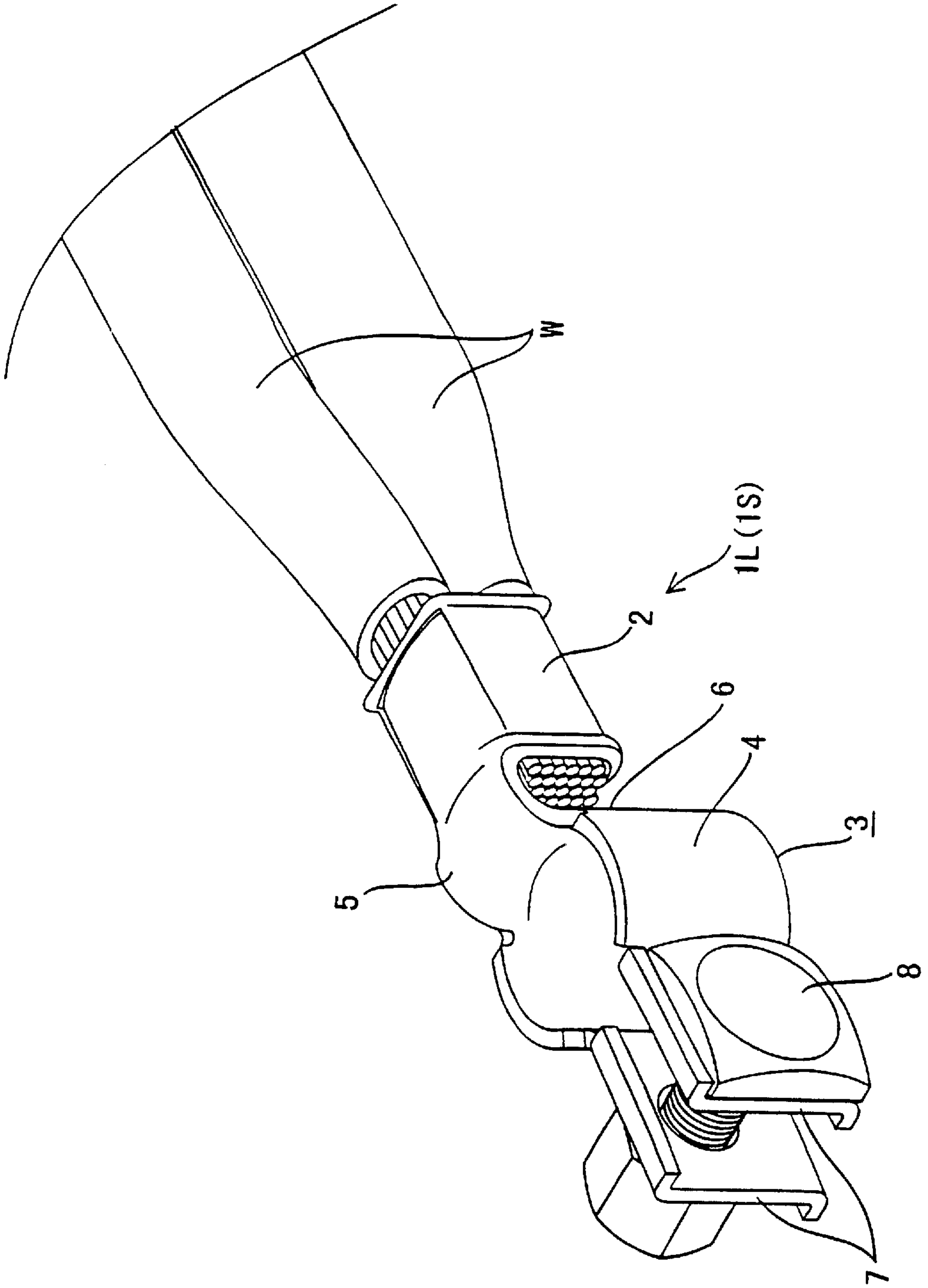
FIG. 1 is a diagonal view showing a battery terminal clamp.

First, the structure of battery terminals 1L and 1S, which are to be protected by the protective cover 10, will be explained. The battery terminal 1L (1S) is made from conductive metal. As shown in FIG. 1, a clamping member 3 which is connected to a battery post (not shown) is provided at an anterior end of an electric wire connecting member 2. An anterior end of an electric wire W is shaved off and the exposed core is clamped within the electric wire connecting member 2. The clamping member 3 has a clamping ring 4 that is clamped to the battery post: this clamping ring 4 is shaped approximately like a short cylinder (specifically, the lower portion thereof is wider). The upper ends (with respect to FIG. 1) of the electric wire connecting member 2 and the clamping ring 4 are connected by means of the connecting member 5. The lower side of this connecting member 5 has a position fixing groove or channel 6 into which a controlling member 43 of the protective cover 10 (described later) can be inserted. The clamping ring 4 has a pair of protruding members 7 protruding in the anterior direction, a tightening bolt 8 being passed through the anterior ends thereof. The clamping ring 4 can be tightened by tightening the tightening bolt 8. In this manner, the clamping ring 4 can tightly clamp the battery post.

In the present embodiment, the two battery posts, to which the battery terminals 1L and 1S are connected, have different diameters depending on the capacity of the battery, etc. Corresponding to these, two kinds of battery terminals 1L and 1S are used whereby the diameters of the clamping rings 4 of the clamping members 3 vary.

Figure 2:
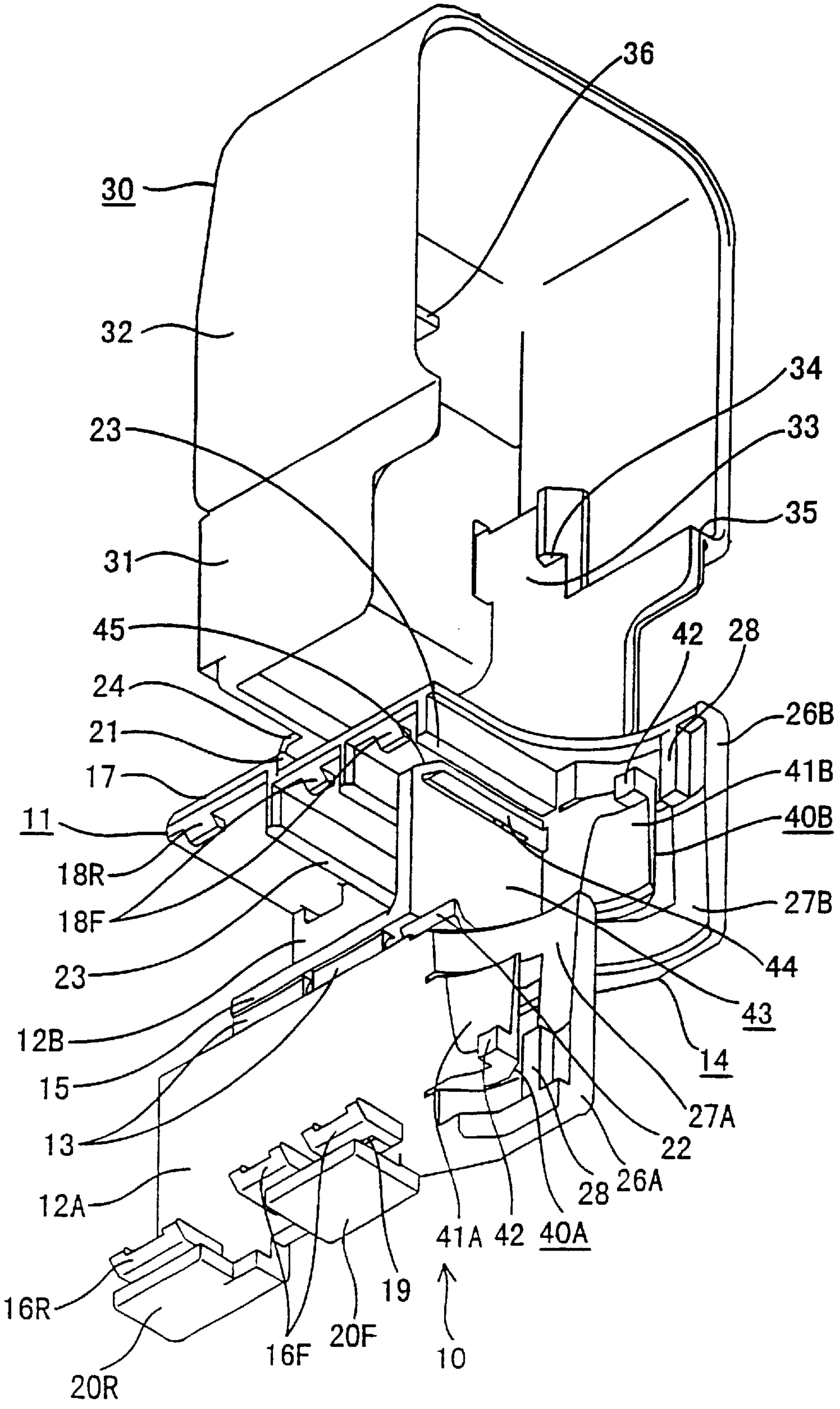
FIG. 2 is a view of a protective cover seen from an open side of a side wall.

Next, the structure of the protective cover 10 is explained. The protective cover 10 is formed from plastic and, as shown in FIG. 2, consists of a main body 11 that surrounds and protects the electric wire connecting member 2 and the clamping ring 4, and a covering member 30 that is connected to the main body by means of a hinge 24 which allows the covering member 30 to open and close. In its closed state, the covering member 30 covers the clamping member 3 from above and from its sides.

Figure 9:
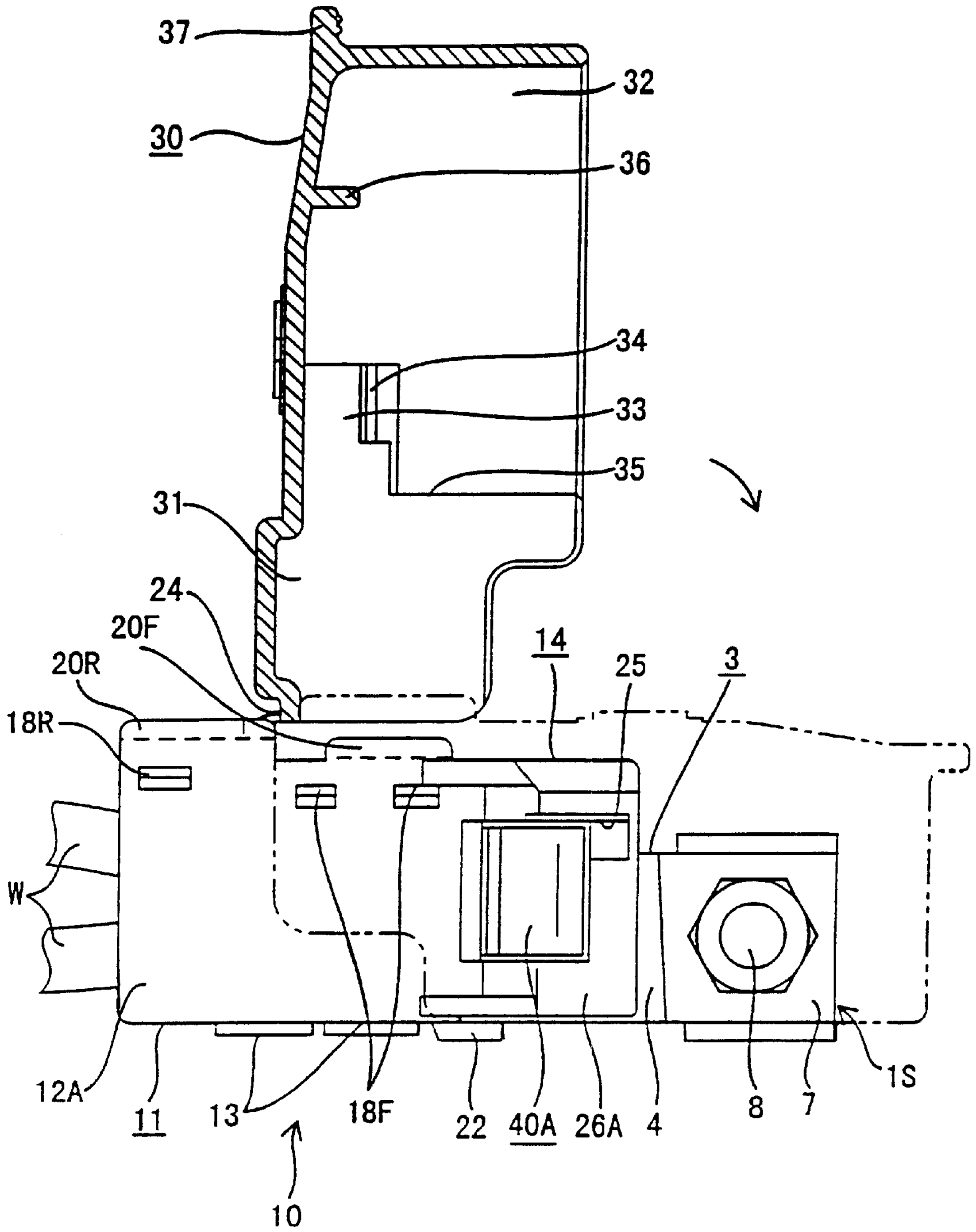
FIG. 9 is a side cross-sectional view showing the operation of closing a covering member.

The main body 11 has a pair of side walls 12A and 12B. As shown in FIG. 2, the side wall 12A can be opened or closed via hinges 13; by this means, portions of the battery terminal 1L (1S) and the anterior end of the electric wire W can be inserted and maintained therein (see FIG. 6). By closing this side wall 12A the main body 11 assumes an approximately angular tubular shape and houses and protects the battery terminals 1L and 1S (see FIG. 9). The anterior portion of the main body 11 has a somewhat wider shape and forms a position fixing member 14 that houses the clamping ring 4 of the battery terminal 1L (1S), thereby serving the function of fixing the position of the battery terminals 1L (1S).

The movable side wall 12A is connected to one side of a base wall 15 by means of two hinges 13. With these hinges 13 as the axis, the side wall 12A can pivot in an up-down direction. The side wall 12A hangs downwards from the base wall 15 when it is in an open state. The end portion of the side wall 12A that is opposite to the hinges 13 has three bendable locking members 16F and 16R. These fit with three locking members 18F and 18R protruding from a roof face of an upper wall 17 of the main body 11. Fitting holes 19 are formed on the central portions of the locking members 16F and 16R. The locking members 18F and 18F fit into these fitting holes 19, thereby maintaining the side wall 12A in a closed state.

Two locking members 16F are formed at the front end of the side wall 12A, and one locking member 16R is formed at the rear end thereof. The locking members 18F and 18R on the upper wall 17 are also formed so as to correspond to these locking members 16F and 16R. Among these, the locking member 16R located in the rear is formed at a position that is displaced downwards with respect to the locking member 16F located in the front. This is because the posterior end of the upper wall 17 is formed in a stepped manner. (FIG. 2).

Two pressing-down plates 20F and 20R are formed on lower edges of the locking members 16F and 16R respectively. When the side wall 12A is in a closed state, the pressing-down plates 20F and 20R make contact with the outer face of the upper wall 17 and the locking members 16F and 16R enter the inner side of the upper wall 17. By this means, the upper wall 17A is clamped between the pressing-down plates 20F and 20R and the locking members 16F and 16R. The pressing-down plates 20R located towards the rear is formed at a location that is slightly displaced downwards compared to the pressing-down plate 20F; this displacement corresponds to the stepped member 21 of the upper wall 17. (FIG. 2).

Figure 3:
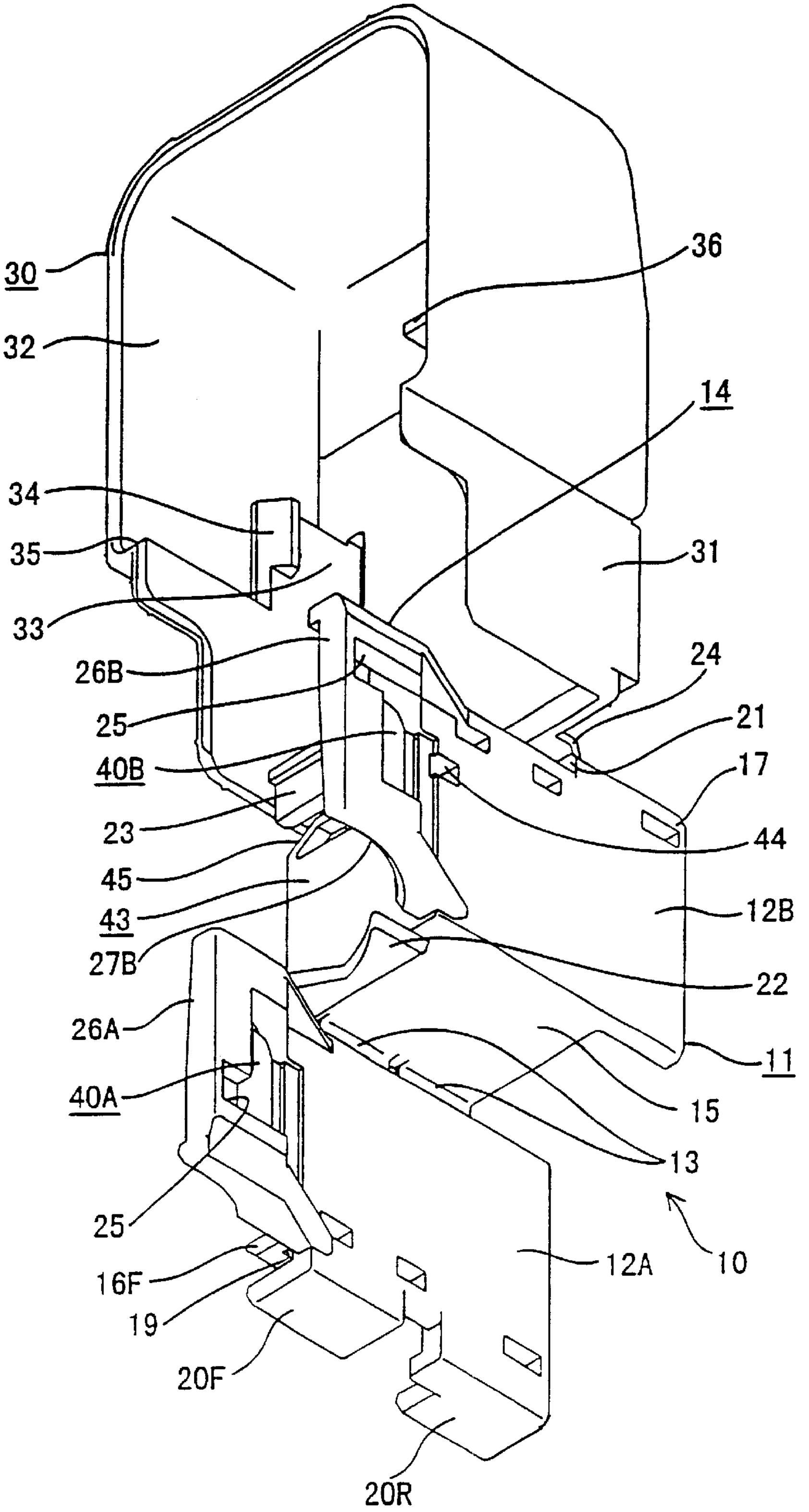
FIG. 3 is a diagonal view of the protective cover seen from the side opposite to that in FIG. 2.

As shown in FIG. 3, a pressing member 22 having an arc-like edge protrudes from an anterior end lower face of the base wall 15, and extends towards the position fixing member 14. When clamping ring 4 is housed inside the position fixing member 14, this pressing member 22 prevents the movement of the battery terminals 1L and 1S by making contact with the outer edge of the base face of the clamping ring 4 (see FIG. 6).

As shown in FIG. 2, the ceiling face of the upper wall 17 has three protruding members 23 extending alone a width-wise direction. The battery terminals 1L and 1S are clamped between the protruding members 23 and the pressing members 22 (see FIG. 6).

The hinge 24 is provided at the anterior end of the stepped member 21 of the upper wall 17. The covering member 30 is attached to the main body 11 via this hinge 24 and is pivotable in an up-down direction with the hinge 24 as axis. The covering member 30 is wider than the main body 11; in particular, the pivoting end is a stepped wide member 32 that is wider than the base member 31.

The covering member 30 is attached so as to be in the vertical position with respect to the main body 11, and the position fixing member 14 has an open area anterior to it. When the covering member 30 is closed so as to cover the main body 11, it covers the position fixing member 14 and the area anterior to it.

The width of the wide member 32 is fixed to be such that it can house the clamping bolt 8 of the battery terminal 1L (1S). The width of the covering member 31 is slightly greater than that of the position fixing member 14.

Figure 4:
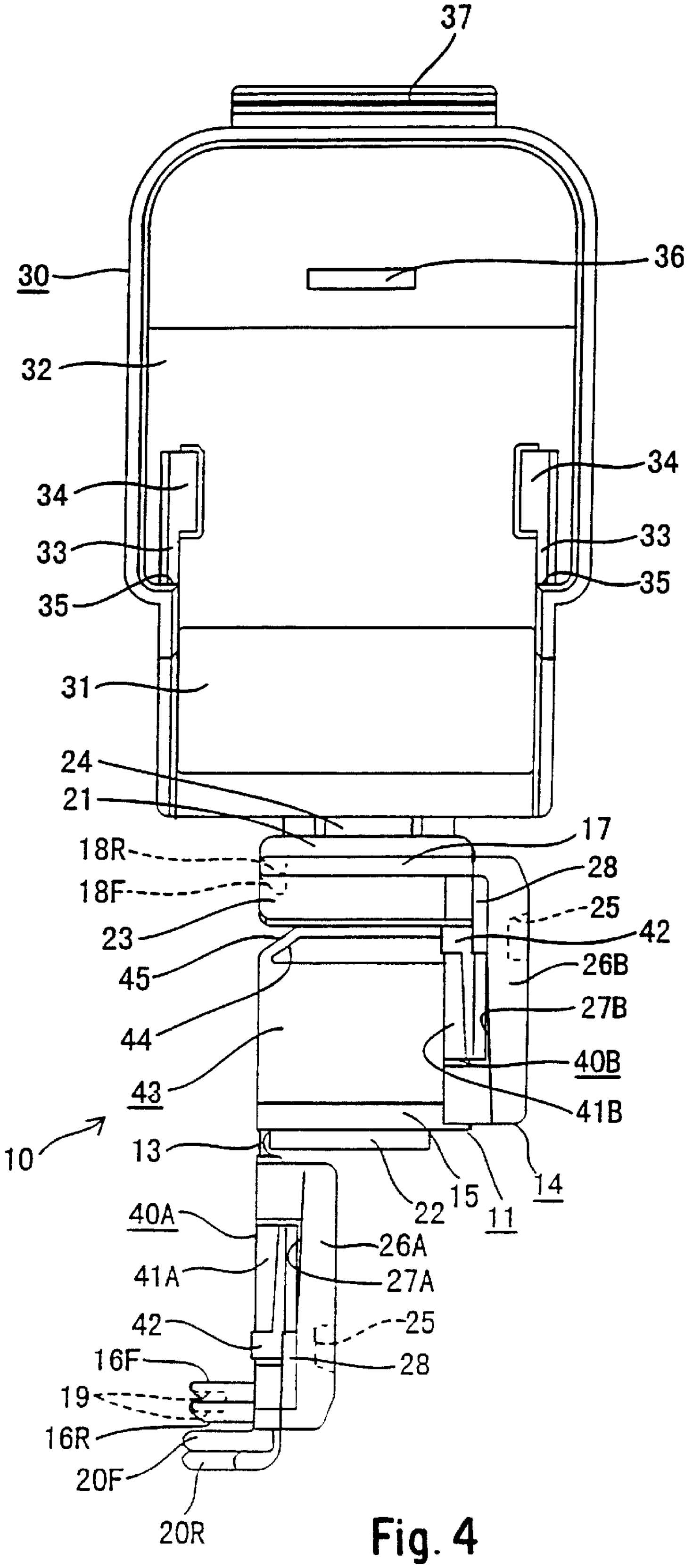
FIG. 4 is a front view of the protective cover.

A pair of stopping arms 33 provided with claws 34 are formed towards the anterior end within the covering member 30. These serve to maintain the covering member 30 in a closed state. These stopping arms 33 are connected to both the roof face of the wide member 32 within the covering member 30 and the stepped member 35 located at the border of the covering member 31, and can bend outwards into a bending space S. The claws 34 protrude from inside the stopping arms 33 and, as shown in FIGS. 3 and 4, engage with a pair of concave shaped receiving members 25 formed inside the main body 11. These receiving members 25 are groove-like and open out in a posterior direction from the outer face of the position fixing member 14. The claws 34 of the stopping arms 33, which engage with the receiving members 25, fit against stepped portions of the receiving members 25.

Figure 5:
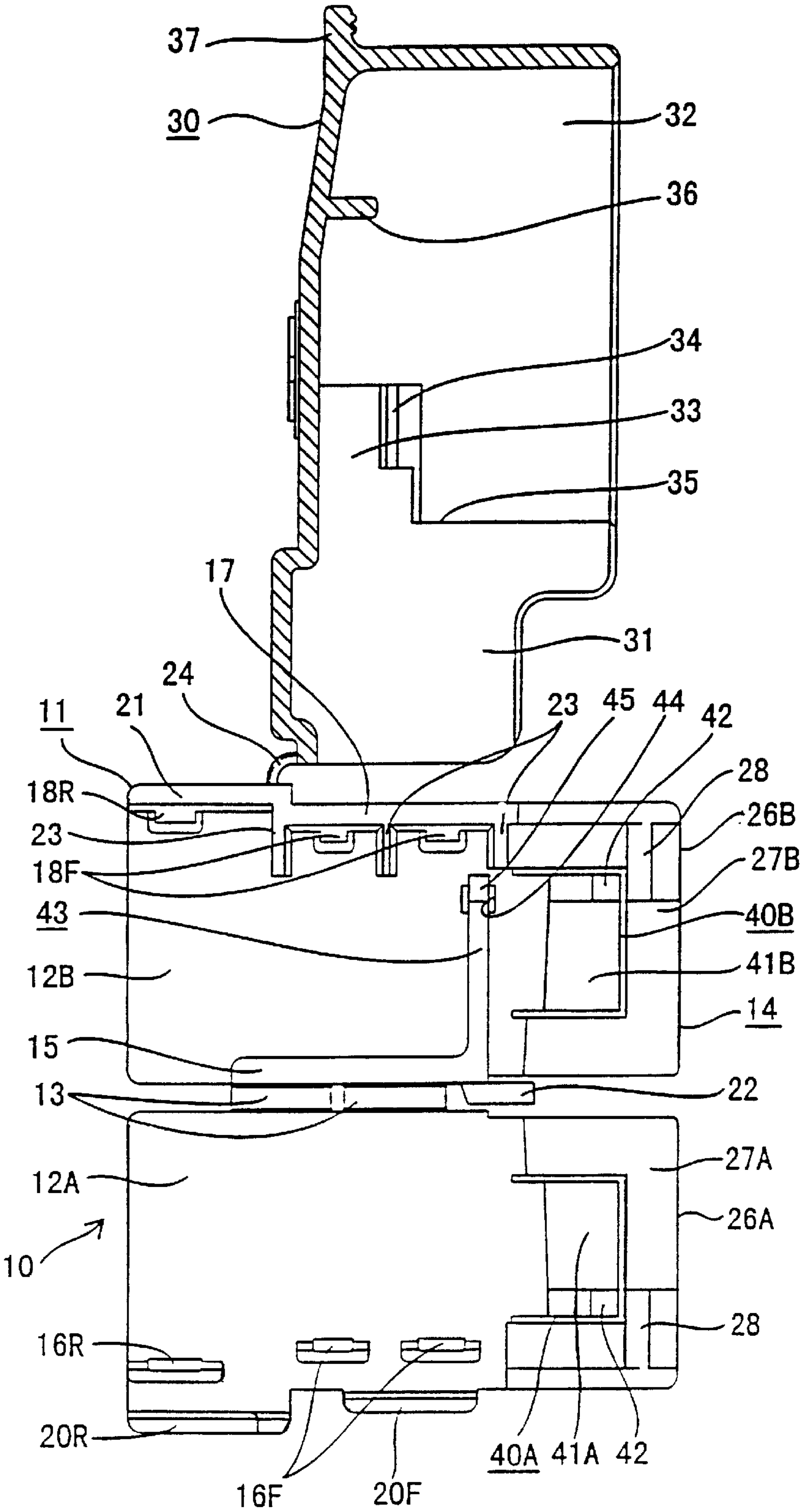
FIG. 5 is a side cross-sectional view of the protective cover.

As shown in FIG. 5, the central portion of the inner face of the wide member 32 has a protruding member 36. When the covering member 30 is closed, this comes to be located above the clamping member 3 of the battery terminal 1L (1S), thereby preventing the battery terminals 1L and 1S from moving. Further, the upper face of the covering member 30 has an operating member 37 that protrudes outwards; this is used to open the covering member 30.

As shown in FIGS. 2 and 3, the position fixing member 14 has a pair of surrounding walls 26A and 26B which protrude outwards from the anterior ends of the side walls 12A and 12B respectively. These surrounding walls 26A and 26B protrude outwards from the main body 11 and extend in an anterior direction. The inner faces thereof are arc-shaped and correspond to the outer faces of the clamping rings 4 of the battery terminals 1L and 1S. These arc-shaped receiving faces 27A and 27B have a diameter whereby they fit tightly with the outer face of the clamping ring 4 of the large battery terminal 11. These receiving faces 27A and 27B fit with the clamping rings 4 by gradually increasing in diameter in accordance with the shapes of the clamping rings 4.

Figure 6:
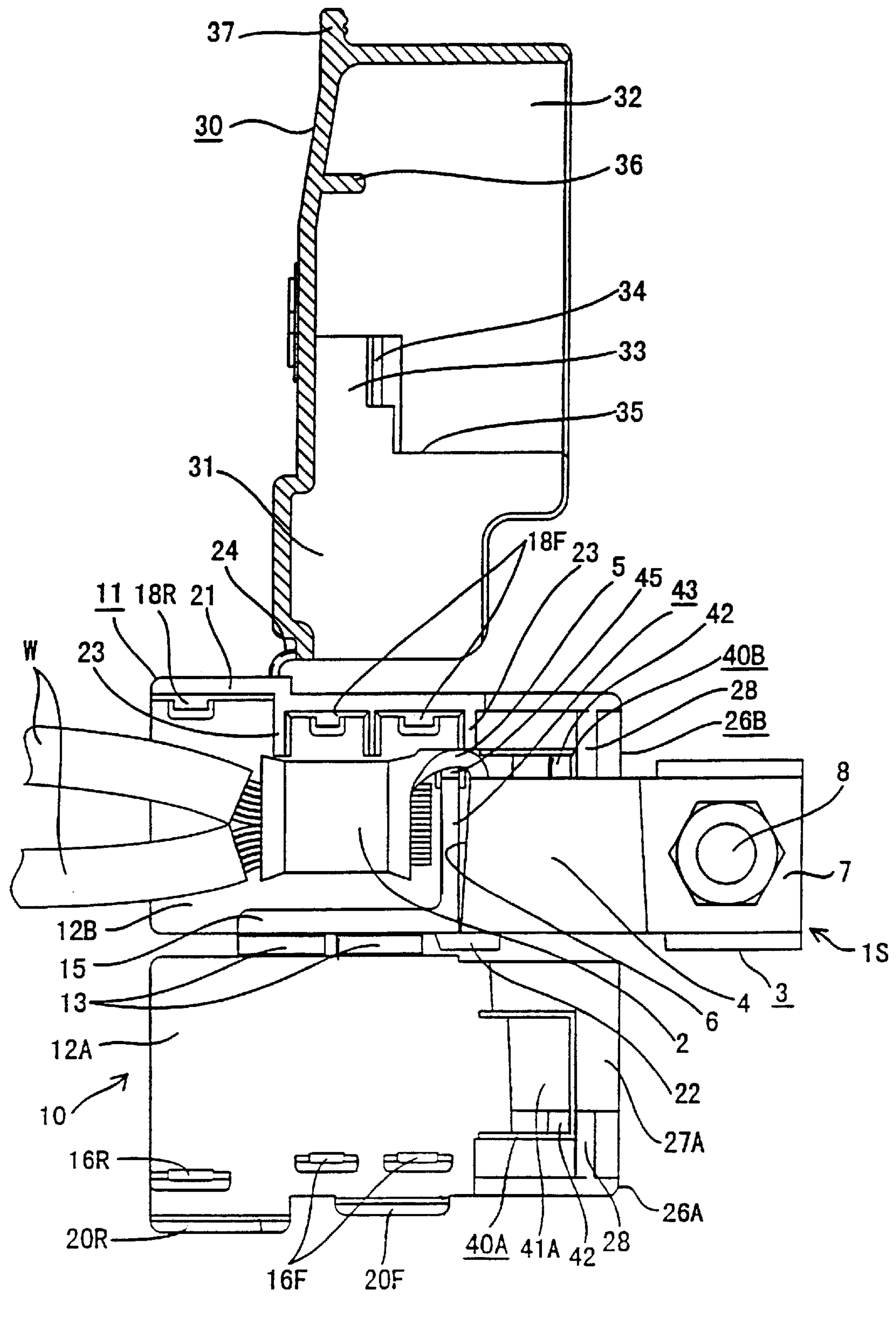
FIG. 6 is a side cross-sectional view showing a small battery terminal in an inserted state in a main body.

Angular pillar-like protruding members 28 are formed in the receiving faces 27A and 27B; they are located at a position somewhat away from the anterior edges of the surrounding walls 26A and 26B. As shown in FIG. 6, these make contact with the periphery of the upper edges of the clamping rings 4 of the inserted battery terminals 1L and 1S and, together with the pressing members 22 of the base wall 15, grip the clamping rings 4, thereby preventing these from moving.

As shown in FIG. 2, resilient movable members 40A and 40B are formed in a cantilevered manner on the surrounding walls 26A and 26B that form the position fixing members 14. The resilient movable members 40A and 40B are formed out of the surrounding walls 26A and 26B and protrude inwards from the receiving faces 27A and 27B. The posterior ends of these resilient movable members 40A and 40B are connected to the surrounding walls 26A and 26B, the resilient movable members 40A and 40B thereby being capable of bending outwards. These resilient movable members 40A and 40B protrude inwards in an arc shape up to their anterior ends, these anterior ends being positioned behind the protruding members 28 which protrude from the receiving faces 27A and 27B of the surrounding walls 26A and 26B.

Figure 8:
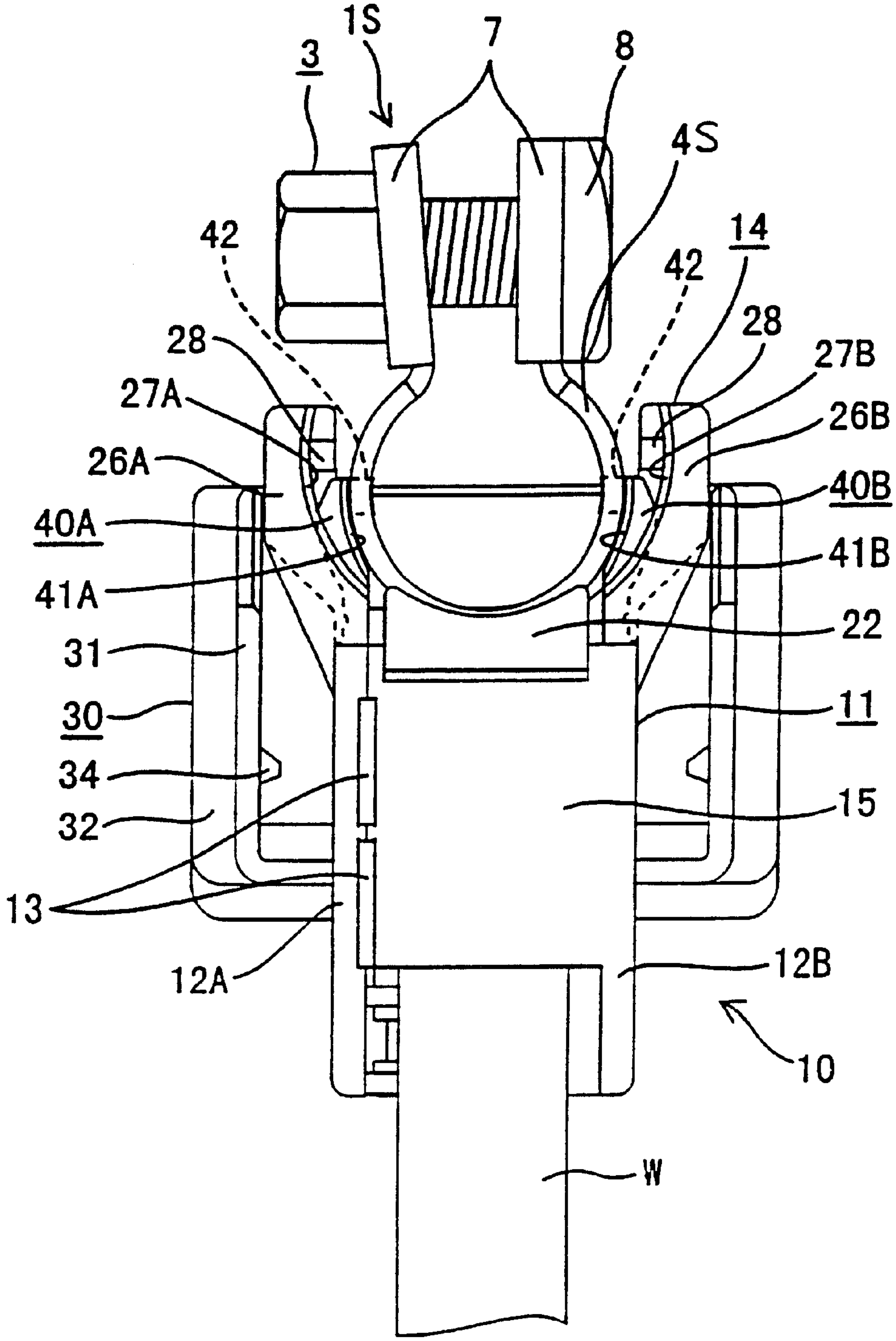
FIG. 8 is a base face view showing the side wall closed and the small battery terminal in a fixed state within the main body.
Figure 11:
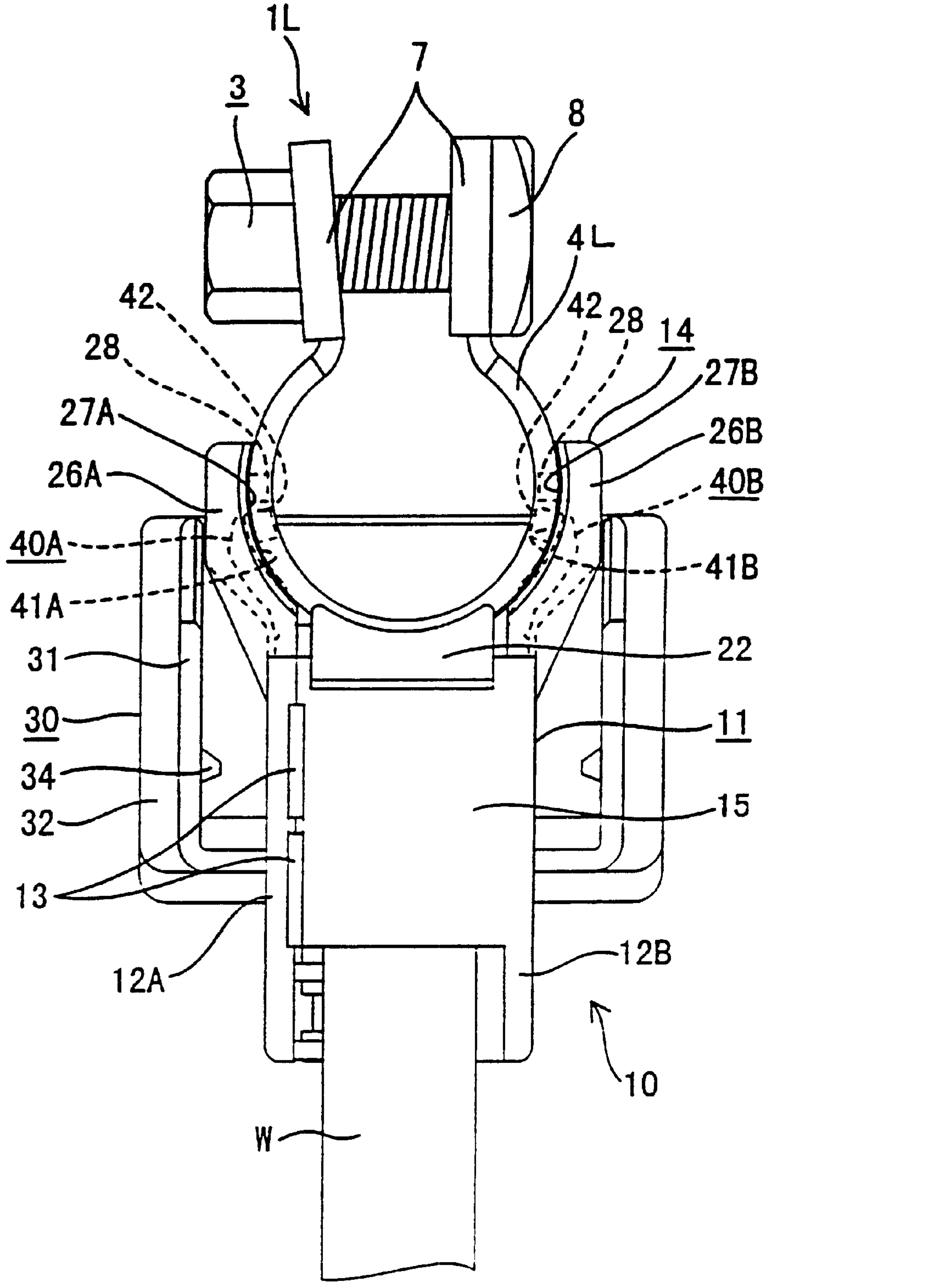
FIG. 11 is a base face view showing the side wall closed and the large battery terminal in a fixed state within the main body.

The inner circumference faces of the resilient movable members 40A and 40B form arc shaped receiving faces 41A and 41B that correspond to the faces of the clamping rings 4 of the battery terminals 1L and 1S. As shown in FIG. 8, these receiving faces 41A and 41B have a diameter whereby they tightly fit with the outer faces of the clamping ring 4S of the battery terminal 1S, which is the smaller of the two battery terminals 1L and 1S. These receiving faces 41A and 41B fit with the clamping ring 4S by gradually increasing in diameter in accordance with the shape of the clamping ring 4S. Further, as shown in FIG. 11, the receiving faces 41A and 41B and the receiving faces 27A and 27B of the surrounding walls 26A and 26B make contact with the clamping ring 4L of the larger battery terminal 1L. The receiving faces 41A and 41B make contact due to the fact that the resilient movable members 40A and 40B move up to a location whereby the receiving faces 41A and 41B of the resilient movable members 40A and 40B are aligned next to the receiving faces 27A and 27B of the surrounding walls 26A and 26B.

As shown in FIG. 2, protruding members 42 protrude inwards from the anterior ends of the resilient movable members 40A and 40B, in the same manner as the protruding members 28 formed on the receiving faces 27A and 27B of the surrounding walls 26A and 26B. As shown in FIG. 5, the protruding members 42 are positioned at the same height as the protruding members 28 of the surrounding walls 26A and 26B. These protruding members 42 have the same function as the protruding members 28 of the surrounding walls 26A and 26B: in the case where the smaller battery terminal 1S is used, they are not in contact with anything, and when the larger battery terminal 1L is used, they make contact with the clamping ring 4L, together with the protruding members 28 of the surrounding walls 26A and 26B.

As shown in FIG. 2, a controlling member 43 protrudes from the anterior side of the base wall 15. As shown in FIG. 6, this controlling member 43 controls the movement of the battery terminals 1L and 1S in an anterior-posterior direction by entering the position fixing grooves 6 of the battery terminals 1L and 1S. The controlling members 43 protrude upwards approximately at a right angle from the anterior portions of the base wall 15 along its entire length, and are connected to the fixed side wall 12B.

The anterior end of the controlling member 43 is located somewhat to the rear of the anterior-most of the two protruding members 23 of the upper wall 17, and there is a specified amount of space between the anterior-most protruding member 23 and the controlling member 43, this space corresponding to the thickness of the connecting members 5 of the battery terminals 1L and 1S. The upper end portion of the controlling member 43 has a groove 44 opened along the width-wide direction; this groove 44 continues to the exterior by being formed right up to the side wall 12B. A tapering face 45 is formed on the upper end of the opening of the controlling member 43. By this means, the insertion of the battery terminals 1L and 1S is facilitated.

The present embodiment is configured as described above; next, the operation thereof is explained. Of the two types of battery terminals 1L and 1S, firstly the case is described wherein the protective cover 10 is attached to the battery terminal 1S which has the smaller clamping ring 4S. As shown in FIG. 2, while the movable side wall 12A is in an opened state, the position of the controlling member 43 of the protective cover 10 is aligned with the position fixing groove 6 of the battery terminal 1S, the battery terminal 1S is inserted horizontally and, as shown in FIG. 6, the electric wire connecting member 2 is inserted along the protruding members 23 of the upper wall 17 and into the main body 11. The protruding end of the electric wire W protrudes to the exterior from the posterior of the main body 11 and the clamping ring 4S of the clamping member 3 enters the resilient movable member 40B within the position fixing member 14.

The battery terminal 1S is inserted until it makes contact with the fixed side wall 12B of the main body 11. At this juncture, the clamping ring 4S is inserted so as to extend along the pressing member 22 of the base wall 15, this clamping ring 4S making contact with the receiving face 41B of the resilient movable member 40B that protrudes from the fixed surrounding wall 26B, and with the protruding member 42.

Figure 7:
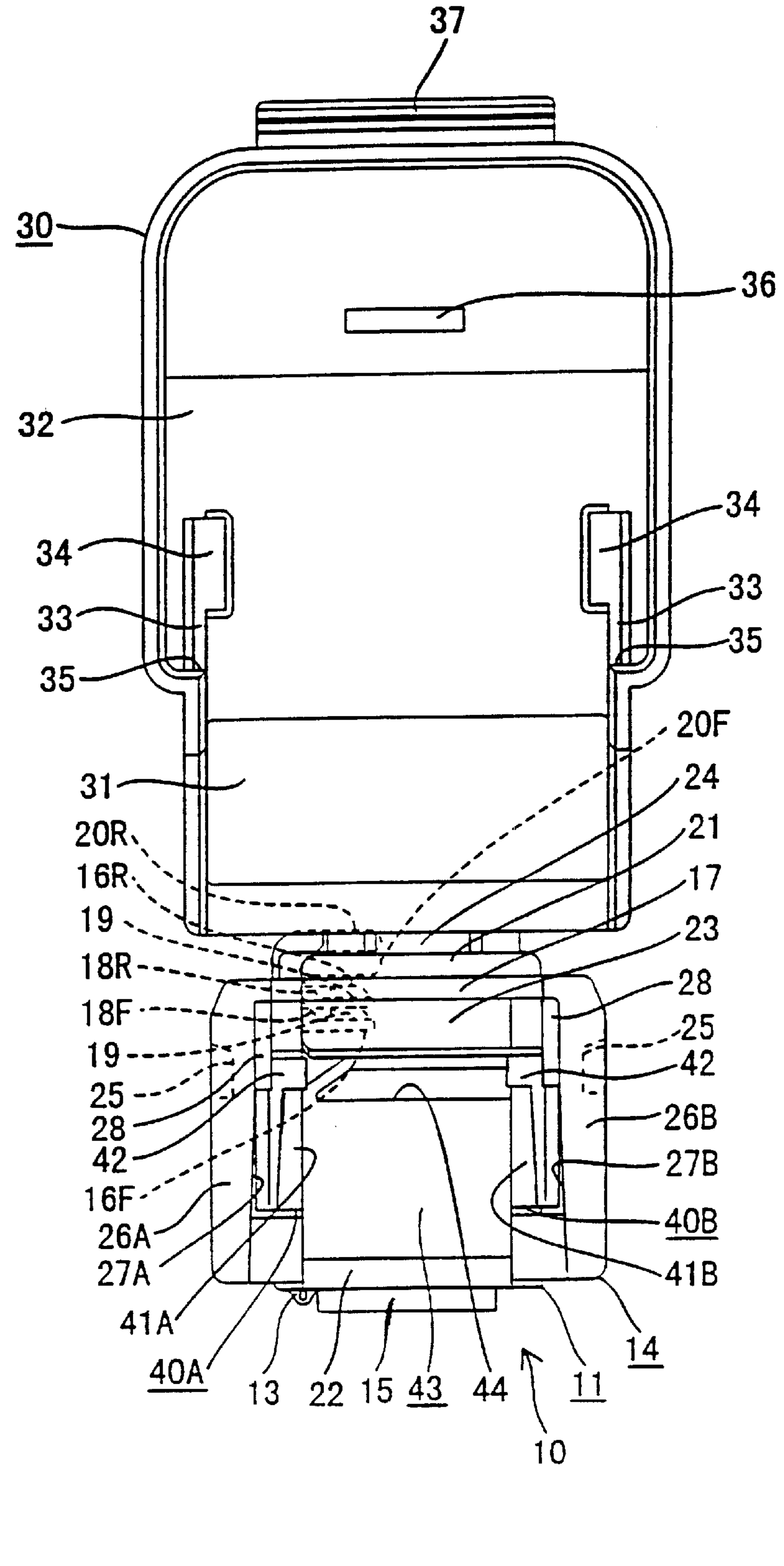
FIG. 7 is a front view showing the side wall in a closed state.

Next, the movable side wall 12A is pivoted upwards using the hinges 13 as the axis. Then, as shown in FIG. 7, the pressing-down plates 20F and 20R make contact with the outer face of the upper wall 17, and the locking members 16F and 16R make contact with the locking members 18F and 18R within the upper wall 17, the locking members 16F and 16R bending as a result and passing the locking members 18F and 18R. Then, the locking members 18F and 18R are inserted into the fitting holes 19, thereby locking the side wall 12A in a closed state. At this juncture, the upper wall 17 is clamped between the pressing-down plates 20F and 20R and the locking members 16F and 16R and the side wall is thereby reliably maintained in a closed state. By this means, the battery terminal 1S can be fixed within the main body 11.

At the same time as the side wall 12A is being closed, as shown in FIG. 8, the clamping ring 4S of the position fixing member 14 makes contact from the side with the resilient movable member 40A of the surrounding wall 26A. At this time, the receiving faces 41A and 41B of the two resilient movable members 40A and 40B make contact with the clamping ring 4S by surrounding its circumference face, and the clamping ring 4S is maintained in a state whereby it is firmly gripped by the receiving faces 41A and 41B of the two resilient movable members 40A and 40B. As this juncture, the resilient movable members 40A and 40B protrude inwards towards the surrounding walls 26A and 26B. Furthermore, both the protruding members 42 that protrudes inwards from the movable resilient movable member 40B and the protruding member 42 that protrudes inwards from the fixed resilient movable member 40B make contact with the circumference face of the upper edge of the clamping ring 4S. The clamping ring 4S is gripped between these protruding members 42 and the pressing member 22, and is thereby fixed securely. By this means, the clamping ring 4S is housed within the position fixing member 14 and the projecting members 7 and a clamping bolt 8 protrude to the anterior of the position fixing member 14.

In this manner, the battery terminal 1S is prevented from moving in the circumference direction and in the anterior-posterior direction by the tubular shaped main body 11, and by the position fixing member 14. In particular, the controlling member 43 reliably prevents the battery terminal 1S from moving in the anterior-posterior direction.

Next, while the covering member 30 is in the opened state, the clamping bolt 8, which is inserted through the battery post, is clamped to the clamping ring 4S, the battery terminal 1S thereby becoming attached in a conductive state to the battery post. Then, as shown by the arrow in FIG. 9, the covering member 30 is pivoted downwards to the right, using the hinge 24 as axis, and the claws 34 of the stopping arms 33 make contact with the upper edge of the position fixing member 14 of the main body 11. The covering member 30 is pivoted further, whereupon the stopping arms 33 bend into the bending space S, thereby causing the covering member 30 to move downwards. Then, after the claws 34 have been inserted into the receiving members 25, the stopping arms 33 return resiliently to their original position. The claws 34 are inside the receiving members 25, and the covering member 30 is maintained in a closed state on the main body 11. At this juncture, the clamping member 3 of the battery terminal 1S is covered from above and from its sides by the covering member 30. By this means, the entirety of the battery terminal 1S is protected by the protective cover 10.

Furthermore, when the covering member 30 is in this closed state, the operation of raising the operating member 37 will release the claws 34 of the stopping arms 33 from their retained state with the receiving members 25, thereby allowing the covering member 30 to be returned to the state whereby it is in a vertical position with respect to the main body 11.

Figure 10:
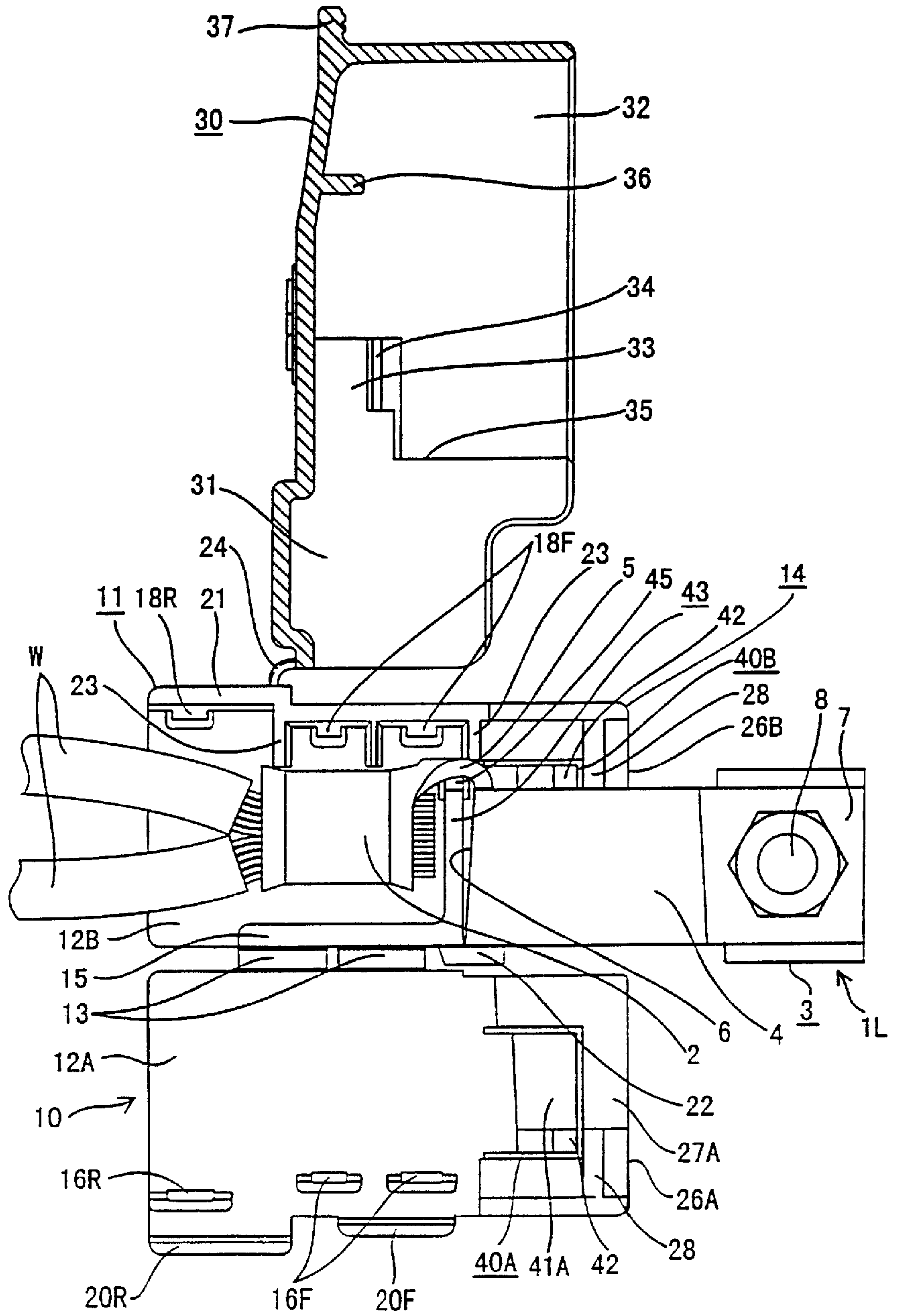
FIG. 10 is a side cross-sectional view showing a large battery terminal in an inserted state in the main body.

Now the case is described wherein the protective cover 10 is attached to the battery terminal 1L, which has the larger clamping ring 4L. As shown in FIG. 10, the battery terminal 1L is inserted from the opened side of the movable side wall 12A, and the clamping ring 4L is inserted so as to make contact with the receiving face 41B of the fixed resilient movable member 40B.

As shown in FIG. 11, when the side wall 12A is closed, the clamping ring 4 makes contact from the side with the resilient movable member 40A of the surrounding wall 26A. The battery terminal 1L is pushed in until the side wall 12A and the resilient movable member 40A make contact with the fixed side wall 12B of the main body 11. At the same time, the two resilient movable members 40A and 40B are bent outwards while they surround the clamping, ring 4L. At this juncture, the receiving faces 41A and 41B of the two resilient movable members 40A and 40B are bent into a position whereby they form a unified face with the receiving faces 27A and 27B of the surrounding walls 26A and 26B. Consequently, the clamping ring 4L is supported by the receiving faces 41A and 41B of the two resilient movable members 40A and 40B and by the receiving faces 27A and 27B of the surrounding walls 26A and 26B.

Figure 12:
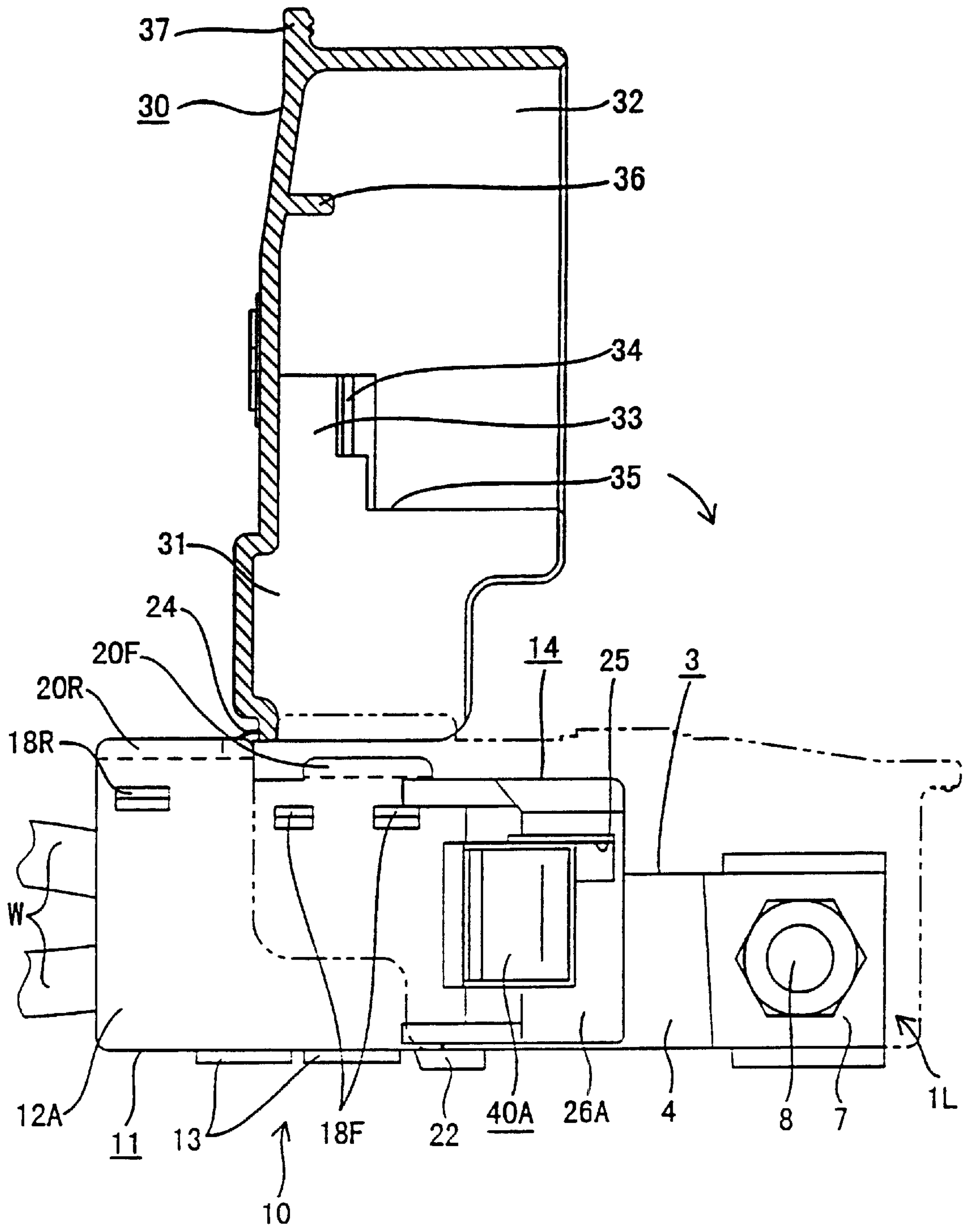
FIG. 12 is a side cross-sectional view showing the operation of closing the covering member.

At this juncture, the protruding members 28 of the surrounding walls 26A and 26B, and the protruding member 42 of the resilient movable member 40A make contact with the circumference face of the upper edge of the clamping ring 4L. The clamping ring 4L is gripped between these protruding members 28 and 42 and the pressing member 22, and is thereby fixed securely. Then, as shown by the arrow in FIG. 12, the covering member 30 is pivoted upwards, thereby causing the claws 34 of the stopping arms 33 to engage with the receiving members 25 located on the outer face of the position fixing member 14, and the clamping member 3 is covered from above and from its sides by the covering member 30.

According to the embodiment above, a single protective cover 10 can correspond to the battery terminals 1L and 1S which have two different sizes. Compared to the case where a specialized protective cover 10 must be produced to correspond to the battery terminals 1L and 1S, production costs can be lowered and, as an increase in the number of parts is avoided, parts management becomes simpler.

When the battery terminals 1L and 1S are attached the controlling member 43 enters into the position fixing groove 6, thereby allowing the position of the battery terminals 1L and 1S to be reliably fixed in an anterior-posterior direction. The controlling member 43 also controls the movement of the battery terminals 1L and 1S in an anterior-posterior direction after these battery terminals 1L and 1S have been housed. Consequently, the position of the battery terminals 1L and 1S can reliably be maintained.

Further, if the protective cover 10 had a form whereby it had the lower face of the main body 11 open, and where the battery terminals 1L and 1S were inserted vertically, the clamping ring 4 may make contact with the lower side faces of the resilient movable members 40A and 40B that protrude into the position fixing member 14, thereby making attachment difficult. However, in the present embodiment, the battery terminals 1L and 1S are inserted horizontally, in a direction parallel to the direction of bending of the resilient movable members 40A and 40B. As a result, the insertion of the battery terminals 1L and 1S becomes simple.

The present embodiment is not limited to the embodiments described above. For example, the possibilities described below also lie within the technical range of the present invention. In addition, the present invention may be embodied in various other ways without deviating from the scope thereof.

(1) In the present embodiment, a case has been described where the protective cover is attached to battery terminals having two sizes. However, the size of the clamping ring can be such that the protective cover can also be attached to a battery terminal having a size between that of the large battery terminal and the small battery terminal which have been described. In that case, the clamping ring would not make contact with the receiving faces of the surrounding walls; the clamping ring would be maintained by the receiving faces of the resilient movable members in their resilient bent state.

(2) In the present embodiment, the side walls are connected via hinges. However, the present invention also includes the case wherein the side walls which have been formed as separate components are attached to the opening portion of the main body by other attaching means.

(3) In the present embodiment, the battery terminals are inserted horizontally. However, the present invention also includes the case wherein the battery terminals are inserted vertically from an open base wall of the main body.

What is claimed is:

1. A protective cover for a clamp type battery terminal of a battery post, the terminal comprising a clamping member and a wire joining member, wherein said cover comprises a body having a position fixing member for housing the clamping member and adapted to grip the circumference of a predetermined size of the clamping member, members resilient protruding to the interior of said position fixing member for contact with a relatively smaller size of the clamping member, said resilient members being adapted to retreat when in contact with the clamping member of said predetermined size.

2. A cover according to claim 1 wherein said body comprises opposite side walls, one of said side walls being hinged for movement between open and closed conditions to permit insertion of the terminal from the side, and said position fixing member being formed from said side walls.

3. A cover according to claim 2 and further including a covering member hinged to said body and movable between a closed position in which the clamping member can be covered and an open position in which the clamping member is not covered, said covering member overlapping said side walls in the closed position.

4. A cover according to claim 1 wherein said members are bendable into a respective recess provided in said position fixing members.

5. A cover according to claim 4 wherein each said recess comprises an aperture of said position fixing member.

6. A cover according to claim 4 wherein said resilient members are adapted to be substantially flush with said position fixing member when gripping the circumference of a predetermined size of the clamping member.

7. A cover according to claim 5 wherein said resilient members are adapted to be substantially flush with said position fixing member when gripping the circumference of a predetermined size of clamping member.

8. A cover according to claim 1 wherein said members are arcuate.

9. A cover according to claim 1 wherein said body further includes a protrusion adapted to engage beneath the clamping member.

10. A cover assembly comprising a cover according to claim 1 in combination with a clamp type battery terminal, the clamping member and wire joining member of said terminal depending from a linking member to define a channel, and said cover further including a projection engageable in said channel to prevent relative movement of said cover orthogonal to said channel.

11. A cover assembly according to claim 10 wherein said projection comprises a wall adapted to fill said channel (6).

* * * * *

UNITED STATES PATENT AND TRADEMARK OFFICE

CERTIFICATE OF CORRECTION

PATENT NO. : 6,376,771 B1
DATED : April 23, 2002
INVENTOR(S) : Shuji Kosuge

It is certified that error appears in the above-identified patent and that said Letters Patent is hereby corrected as shown below:

<u>Title page,</u>
Item [57], ABSTRACT,
Line 2, change "includes" to -- comprises --.

<u>Column 8,</u>
Line 60-61, change "members resilient" to -- resilient members --.

Signed and Sealed this

Eleventh Day of March, 2003

JAMES E. ROGAN
*Director of the United States Patent and Trademark Office*